United States Patent
Long (10) Patent No.: US 12,156,160 B2
(45) Date of Patent: Nov. 26, 2024

(54) METHOD, APPARATUS AND COMPUTER PROGRAM PRODUCT FOR SUPPORTING INTERWORKING BETWEEN CORE NETWORKS

(71) Applicant: Telefonaktiebolaget LM Ericsson (publ), Stockholm (SE)

(72) Inventor: Hongxia Long, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 384 days.

(21) Appl. No.: 17/604,585

(22) PCT Filed: Apr. 16, 2020

(86) PCT No.: PCT/CN2020/085127
§ 371 (c)(1),
(2) Date: Oct. 18, 2021

(87) PCT Pub. No.: WO2020/216125
PCT Pub. Date: Oct. 29, 2020

(65) Prior Publication Data
US 2022/0248361 A1    Aug. 4, 2022

(30) Foreign Application Priority Data

Apr. 26, 2019 (WO) ................ PCT/CN2019/084674

(51) Int. Cl.
*H04W 60/00* (2009.01)
*H04W 8/04* (2009.01)
*H04W 24/08* (2009.01)

(52) U.S. Cl.
CPC .......... *H04W 60/005* (2013.01); *H04W 8/04* (2013.01); *H04W 24/08* (2013.01)

(58) Field of Classification Search
CPC ..... H04W 60/005; H04W 8/10; H04W 24/08; H04W 8/04
See application file for complete search history.

(56) References Cited

U.S. PATENT DOCUMENTS 11,856,652 B2 * 12/2023 Jain .................... H04W 8/22
2018/0132141 A1 * 5/2018 Huang-Fu ........... H04W 36/04
(Continued)

FOREIGN PATENT DOCUMENTS

| RU | 2491749 C2 | 8/2013 |
| WO | 2018169244 A1 | 9/2018 |
| WO | 2019196602 A1 | 10/2019 |

OTHER PUBLICATIONS

Russian Office Action with English Summary Translation dated Mar. 28, 2022 for Patent Application No. 2021134355/07 filed Apr. 16, 2020, consisting of 16-pages.
(Continued)

*Primary Examiner* — Brian D Nguyen
(74) *Attorney, Agent, or Firm* — Weisberg I.P. Law, P.A.

(57) ABSTRACT

The present disclosure generally relates to interworking between core networks (CNs) and more particularly, to a method for supporting interworking between CNs and to apparatus and computer program products adapted for the same purpose. According to one aspect, an apparatus for supporting interworking between core networks (CNs) includes: a storage device configured to store a computer program comprising computer instructions; and a processor coupled to the storage device and configured to execute the computer instructions to: —a) in response to a CN registration state change for a user equipment (UE), determine whether the UE subscribes to a notification service for the CN registration state change; and —b) if subscribing to the notification service, notify the CN registration state change
(Continued)

of a network function (NF) node performing a function associated with the CN registration state change.

22 Claims, 7 Drawing Sheets

(56) References Cited

U.S. PATENT DOCUMENTS

| | | | |
|---|---|---|---|
| 2018/0376384 | A1 | 12/2018 | Youn et al. |
| 2019/0037448 | A1 | 1/2019 | Shan et al. |
| 2020/0336321 | A1* | 10/2020 | Ding ............... H04L 12/1407 |
| 2021/0029594 | A1* | 1/2021 | Kunz ................ H04W 36/18 |
| 2021/0160890 | A1* | 5/2021 | Selvanesan ......... H04W 72/56 |
| 2021/0266726 | A1* | 8/2021 | Chun ................ H04W 8/005 |
| 2021/0352464 | A1* | 11/2021 | Xu .................... H04W 60/04 |
| 2022/0007150 | A1* | 1/2022 | Edge ................ H04W 4/029 |
| 2022/0141647 | A1* | 5/2022 | Castellanos Zamora ............ H04W 8/186 455/418 |
| 2023/0199453 | A1* | 6/2023 | Xu ...................... H04W 8/18 455/418 |

OTHER PUBLICATIONS

3GPP TSG-SA2 Meeting #132 S2-1903956 (Rev of S2-1903887); Title: TS23.502, Clarification of header compression and other editorial update; Source to WG: ZTE; Source to TSG: SA2; Work Item Code: 5G_CIoT; Date and Location: Apr. 8-12, 2019, Xi'an, China, consisting of 15-pages.

SA WG2 Meeting #127 S2-183982; Title: Solution for KI#9 common north-bound APIs for EPC-5GC interworking; Agenda Item: 6.9; Source: Huawei, HiSilicon; Work Item/Release: FS_CIot_5G/Rel16; Document for: Approval; Date and Location: Apr. 16-20, 2018, Sanya, China, consisting of 7-pages.

International Search Report and Written Opinion dated Jul. 15, 2020 for International Application No. PCT/CN2020/085127 filed Apr. 16, 2020, consisting of 7 pages.

3GPP TS23.501 V16.0.2; Title: 3rd Generation Partnership Project; Technical Specification Group Services and System Aspects; System Architecture for the 5G System: Stage 2 (Release 16); Apr. 2019; consisting of 317 pages.

3GPP TS 23.502 V16.0.2; Title: 3rd Generation Partnership Project; Technical Specification Group Services and System Aspects; Procedures for the 5G System; Stage 2 (Release 16); Apr. 2019; consisting of 419 pages.

3GPP TS 29.503 V15.3.0; Title: 3rd Generation Partnership Project; Technical Specification Group Core Network and Terminals; 5G System; Unified Data Management Services; Stage 3 (Release 15); Mar. 2019; consisting of 187 pages.

3GPP TSG-CT WG4 Meeting #91 C4-192385 (was C4-192207); Title: Subscription to event "Change of Core Network Type"; Source to WG: Ericsson, Huawei; Source to TSG: CT4; Work item code: 5G_CIoT; Date and Location: May 13-17, 2019, Reno, US; consisting of 9 pages.

Japanese Office Action and English Summary dated Nov. 25, 2022 for Application No. 2021-553154, consisting of 7 pages.

SA WG2 Meeting #128 S2-187216; Title: Concluding Key Issue #9; Source: Convida Wireless LLC, AT&T, Huawei, Hisilicon, Nokia, Nokia Shanghai Bell; Document for: Approval; Agenda Item: 6.9; Work Tem / Release: FS_CIoT_5G / Rel15; Location and Date: Vilnius, Lithuania, Jul. 2-6, 2018, consisting of 22 pages.

3GPP TSG-SA WG2 Meeting #131 S2-1902428; Title: Procedures for solution 14 to key issue 9; Source to WG: Huawei, HiSilicon; Work item code: 5G_CIoT; Location and Date: Santa Cruz, Tenerif, ES, Feb. 25-Mar. 1, 2019, consisting of 16 pages.

* cited by examiner

METHOD, APPARATUS AND COMPUTER PROGRAM PRODUCT FOR SUPPORTING INTERWORKING BETWEEN CORE NETWORKS

TECHNICAL FIELD

The present invention generally relates to interworking between core networks (CNs). More particularly, the present invention relates to a method for supporting interworking between CNs. The present invention also relates to apparatus and computer program product adapted for the same purpose.

BACKGROUND

Deployments based on different 3GPP architecture options (e.g., EPC based or 5GC based) and UEs with different capabilities (e.g., EPC NAS and 5GC NAS) may coexist within one PLMN.

In order to support smooth migration, the EPC and the 5GC have access to a common subscriber database, e.g., Home Subscriber Server (HSS) in the case of EPC and Unified Database Management (UDM) in the case of 5GC, as defined in TS 23.002, which is incorporated herein by reference in its entirety.

In scenarios where interworking between 5GS and EPC is available, the network configuration is expected to associate UEs with SCEF+NEF node(s) for Service Capability Exposure. The SCEF+NEF hides the underlying 3GPP network topology from Application Function (AF), e.g. SCS/AS, and hides information on whether the UE is served by 5GC or EPC.

If the service exposure function that is associated with a given service for a UE is configured in the UE's subscription information, then an SCEF+NEF identity shall be used to identify the exposure function. For example, if a UE is capable of switching between EPC and 5GC, then the SCEF ID that is associated with any of the UE's APN configurations should point to an SCEF+NEF node.

SUMMARY OF THE INVENTION

According to one aspect of the present invention, an apparatus for supporting interworking between core networks (CNs), comprising: a storage device configured to store a computer program comprising computer instructions; and a processor coupled to the storage device and configured to execute the computer instructions to:
  a) in response to a CN registration state change for a user equipment (UE), determine whether the UE subscribes to a notification service for the CN registration state change; and
  b) if subscribing to the notification service, notify the CN registration state change of a network function (NF) node performing a function associated with the CN registration state change.

Preferably, the apparatus is implemented by a combination of a Home Subscriber Server (HSS) and a Unified Database Management (UDM).

Preferably, the apparatus is implemented by a combination of a Home Subscriber Server (HSS), a Unified Database Management (UDM), and a Unified/User Data Repository (UDR).

Preferably, the NF node is a Service Capability Exposure function (SCEF)+Network Exposure Function (NEF) node.

Preferably, the notifying is performed by sending the NF node a report indicating which CN the UE currently registers.

Preferably, the notifying is performed by sending the NF node a report indicating which CNs the UE currently and previously registers.

Preferably, the CN comprises an EPC network and a 5G core network, and the CN registration state change is at least one of the following: switching from single registration in 5G to single registration in EPC, switching from single registration in 5G to dual registration in EPC+5G, switching from single registration in EPC to single registration in 5G, switching from single registration in EPC to dual registration in EPC+5G, switching from dual registration in EPC+5G to single registration in 5G, switching from dual registration in EPC+5G to single registration in EPC.

Preferably, the function relates to monitoring UE reachability for data or location update.

Preferably, the subscribing is performed by receiving a request for subscribing to the notification service from the SCEF+NEF node.

According to another aspect of the present invention, a method for supporting interworking between core networks (CNs), comprising the following steps carried out at a user profile server:
  a) in response to a CN registration state change for a user equipment (UE), determining whether the UE subscribes to a notification service for the CN registration state change; and
  b) if subscribing to the notification service, notifying the CN registration state change of a network function (NF) node performing a function associated with the CN registration state change.

According to another aspect of the present invention, a computer program product for supporting interworking between core networks (CNs), is embodied in a computer readable storage medium and comprises computer instructions for:
  a) in response to a CN registration state change for a user equipment (UE), determining whether the UE subscribes to a notification service for the CN registration state change; and
  b) if subscribing to the notification service, notifying the CN registration state change of a network function (NF) node performing a function associated with the CN registration state change.

According to another aspect of the present invention, a network function (NF) node for supporting interworking between core networks (CNs) comprises:
  a storage device configured to store a computer program comprising computer instructions; and
  a processor coupled to the storage device and configured to execute the computer instructions to:
    a) send to a user profile server a request for subscribing to a notification service for a CN registration state change for a user equipment (UE);
    b) receive from the user profile server a report on the CN registration state change; and
    c) perform a function associated with the CN registration state change.

Preferably, the NF node is a Service Capability Exposure function (SCEF)+Network Exposure Function (NEF) node.

Preferably, the processor is configured to further execute the computer instructions to:
  send to the user profile server a request for unsubscribing to the notification service.

According to another aspect of the present invention, a method for supporting interworking between core networks (CNs) comprises the following steps carried out at a network function (NF) node:
- a) sending to a user profile server a request for subscribing to a notification service for a CN registration state change for a user equipment (UE);
- b) receiving from the user profile server a report on the CN registration state change; and
- c) performing a function associated with the CN registration state change.

According to another aspect of the present invention, a computer program product for supporting interworking between core networks (CNs), is embodied in a computer readable storage medium and comprises computer instructions for:
- a) send to a user profile server a request for subscribing to a notification service for a CN registration state change for a user equipment (UE);
- b) receive from the user profile server a report on the CN registration state change; and
- c) perform a function associated with the CN registration state change.

In one or more embodiments of the present invention, by exposing the CN type change event, the NF nodes can perform functions associated with or affected by the CN type change. For example, it assumes that AF monitors an event, e.g., UE reachability for data or location update, through SCEF+NEF, and initially the event is subscribed from AMF. When the UE is attached to MME later due to mobility from 5G to 4G, the CN type change will be notified, and thus SCEF+NEF could then perform the same monitoring event towards MME. This change, however, is transparent to AF.

BRIEF DESCRIPTION OF THE DRAWINGS

The foregoing and other objects, features, and advantages of the invention would be apparent from the following more particular description of preferred embodiments as illustrated in the accompanying drawings in which.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "Exposure Function (EF)" refers to a functional entity for exposing network capabilities and events detected, e.g., by other network functions. The non-exclusive examples of the EF include Service Capability Exposure Function (SCEF) as defined under 3GPP TS23.682 or Network Exposure Function (NEF) as defined under TS23.502. Both of these 3GPP Specifications are incorporated herein by reference in its entirety.

Figure 1:
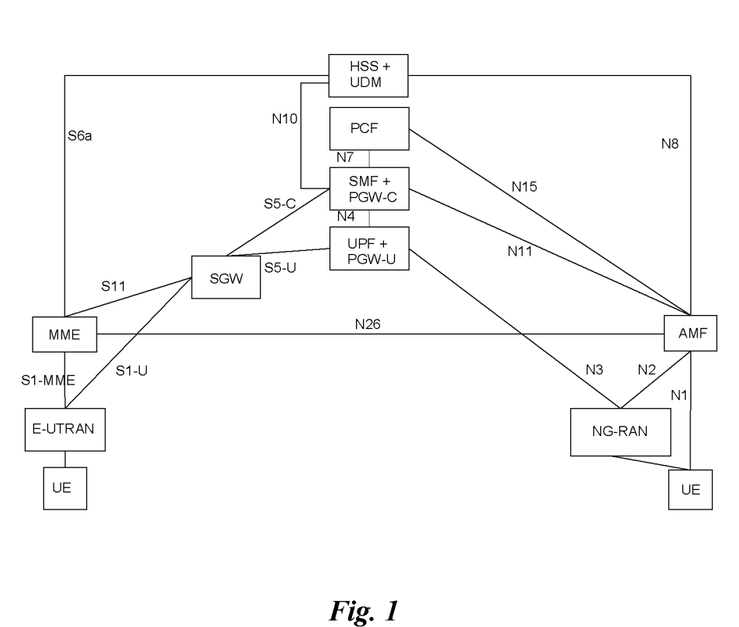
FIG. 1 illustrates a system architecture for interworking between 5G system (5GS) and EPC system (EPS).

FIG. 1 illustrates a system architecture for interworking between 5G system (5GS) and EPC system (EPS).

As shown in FIG. 1, N26 interface is an inter-CN interface between Mobility Management Entity (MME) and Access and Mobility Management Function (AMF) in order to enable interworking between EPC and NG core. Support for N26 interface is optional for interworking. N26 supports subset of the functionalities (essential for interworking) that are supported over S10.

In the system architecture as shown in FIG. 1, PGW-C+SMF and UPF+PGW-U are dedicated to interworking between 5GS and EPC, which are optional and are based on UE MM Core Network Capability and UE subscription. UEs that are not subject to 5GS and EPC interworking may be served by entities not dedicated to interworking, i.e. by either by PGW or SMF/UPF.

Between NG-RAN and UPF+PGW-U, another UPF (not shown in FIG. 1) could be provided, i.e. the UPF+PGW-U can support N9 towards an additional UPF, if needed.

In order to interwork with EPC, a UE with both 5GC and EPC NAS capabilities can operate in a single-registration mode or a dual-registration mode. In the single-registration mode, a UE has only one active MM state (either RM state in 5GC or EMM state in EPC) and is either in 5GC NAS mode or in EPC NAS mode. The UE maintains a single coordinated registration for 5GC and EPC. Accordingly, the UE maps an EPS-GUTI to a 5G GUTI during mobility between EPC and 5GC and vice versa. To enable re-use of a previously established 5G security context when returning to 5GC, the UE also keeps the native 5G-GUTI and the native 5G security context when moving from 5GC to EPC.

On the other hand, in the dual-registration mode, a UE handles independent registrations for 5GC and EPC using separate RRC connections. Furthermore, the UE maintains 5G-GUTI and EPS-GUTI independently, provides the native 5G-GUTI, if previously allocated by 5GC, for registrations towards 5GC, and provides the native EPS-GUTI, if previously allocated by EPC, for Attach/TAU towards EPC. In this mode, the UE may be registered to 5GC only, EPC only, or to both 5GC and EPC.

Figure 2:
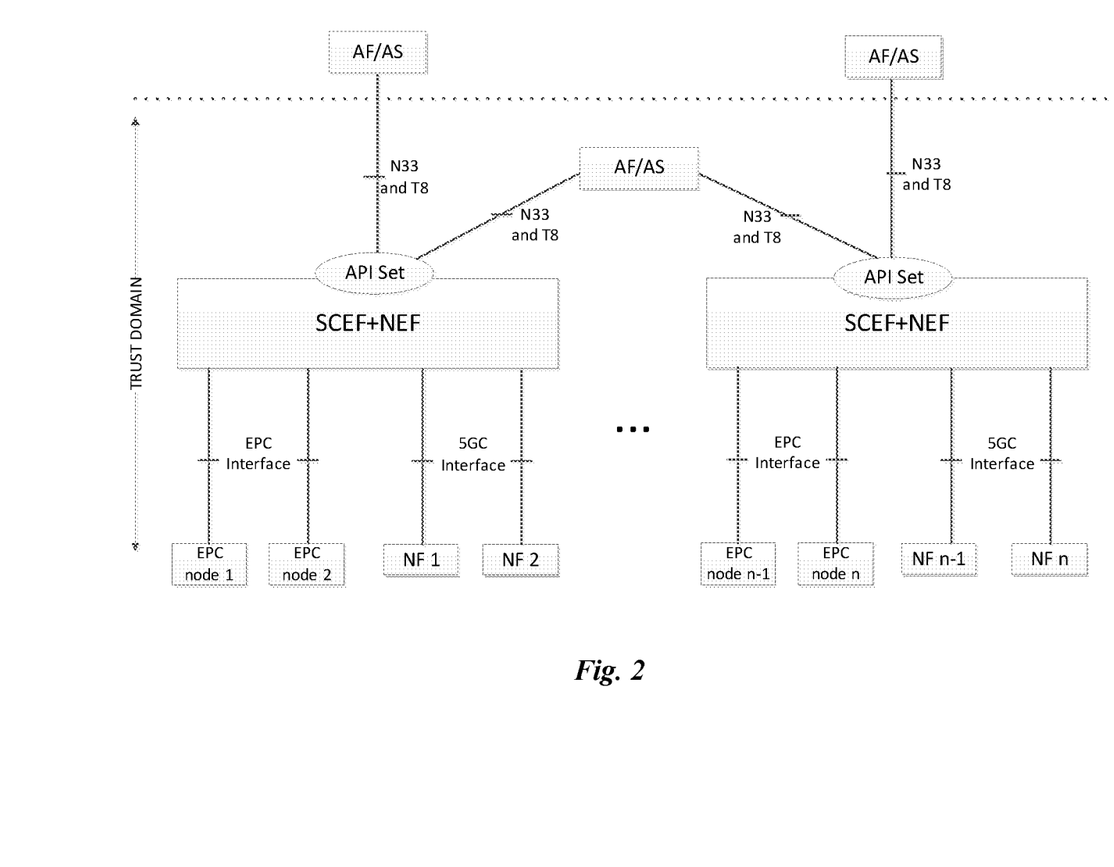
FIG. 2 shows an architecture for Service Exposure for EPC-5GC Interworking.

The support for the single registration mode is mandatory for UEs that support both 5GC and EPC NAS. FIG. 2 shows an architecture for Service Exposure for EPC-5GC Interworking. If a UE has mobility capability between EPS and 5GS, it will be associated with a Service Capability Exposure function (SCEF)+Network Exposure Function (NEF) node for Service Capability Exposure.

As shown in FIG. 2, Trust domain for SCEF+NEF is the same as Trust domain for SCEF as defined in TS 23.682, which is incorporated herein by reference in its entirety. EPC Interface represents southbound interfaces between SCEF and EPC nodes e.g. S6t interface between SCEF and HSS, T6a interface between SCEF and MME, etc. All southbound interfaces from SCEF are defined in TS 23.682 and are not shown for the sake of simplicity.

In FIG. 2, 5GC Interface represents southbound interfaces between NEF and 5GC Network Functions e.g. N29 interface between NEF and SMF, N30 interface between NEF and PCF, etc. All southbound interfaces from NEF are not shown for the sake of simplicity.

Interaction between the SCEF and NEF within the combined SCEF+NEF is required. For example, when the SCEF+NEF supports monitoring APIs, the SCEF and NEF need to share context and state information on a UE's configured monitoring events in case the UE moves between from EPC and 5GC.

The north-bound APIs which can be supported by an EPC or 5GC network are discovered by the SCEF+NEF node via the CAPIF function and/or via local configuration of the SCEF+NEF node. Different sets of APIs can be supported by the two network types.

For Nudm_EventExposure service, the following service operations can be defined:
Subscribe
Unsubscribe
Notify The Nudm_EventExposure service is used by consumer NFs (e.g., NEF) to subscribe to notification of event occurrence by means of a Subscribe service operation. For events that can be detected by AMF, UDM makes use of an appropriate AMF service operation to subscribe on behalf of the consumer NF.

The Nudm_EventExposure service is also used by the consumer NFs (e.g. NEF) to unsubscribe to the notification by means of an Unsubscribe service operation. For events that can be detected by the AMF, the UDM makes use of the appropriate AMF service operation to unsubscribe on behalf of the consumer NF.

The Nudm_EventExposure service is also used by the subscribed consumer NFs to get notified by the UDM when a subscribed event occurs at the UDM by means of a Notify service operation. For subscribed events that can occur at the AMF, the consumer NF makes use of the corresponding AMF service operation to get notified by the AMF directly without UDM involvement.

Figure 3:
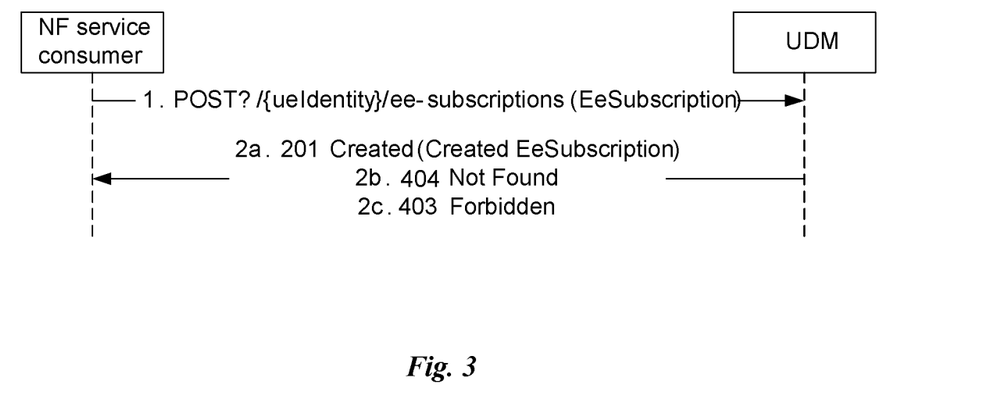
FIG. 3 shows a scenario where the NF service consumer sends a request to the UDM to subscribe to notifications of event occurrence.

FIG. 3 shows a scenario where the NF service consumer sends a request to the UDM to subscribe to notifications of event occurrence. The request contains a callback URI, the type of event that is monitored and additional information, e.g., event filters and reporting options.

The NF service consumer sends a POST request to the parent resource (collection of subscriptions) ( . . . /{ueIdentity}/ee-subscriptions), to create a subscription as present in message body. The request may contain an expiry time, suggested by the NF Service Consumer, representing the time up to which the subscription is desired to be kept active and the time after which the subscribed event(s) shall stop generating notifications.

If success, the UDM responds with "201 Created" with the message body containing a representation of the created subscription at step 2a. The Location HTTP header contains the URI of the created subscription. If the event subscription was for a group of UEs:

The "maxNumOfReports" in the "reportingOptions" IE shall be applicable to each UE in the group;
The UDM shall return the number of UEs in that group in the "numberOfUes" IE.

The NF service consumer shall keep track of the maximum number of reports reported for each UE in the event report and when "maxNumOfReports*numberOfUes" limit is reached, the NF service consumer shall initiate the unsubscription of the notification towards the UDM.

The response, based on operator policy, may contain the expiry time, as determined by the UDM, after which the subscription becomes invalid. Once the subscription expires, if the NF Service Consumer wants to keep receiving notifications, it shall create a new subscription in the UDM. The NF Service Producer shall not provide the same expiry time for many subscriptions in order to avoid all of them expiring and recreating the subscription at the same time. If the expiry time is not included in the response, the NF Service Consumer shall not associate an expiry time for the subscription.

If the user does not exist, at step 2b, HTTP status code "404 Not Found" is returned, including additional error information in the response body (in the "ProblemDetails" element).

If there is no valid subscription data for the UE, i.e. based on the UE's subscription information, monitoring of the requested EventType is not allowed, or the requested EventType is not supported, at step 2c, HTTP status code "403 Forbidden" is returned including additional error information in the response body (in the "ProblemDetails" element).

On failure, the appropriate HTTP status code indicating the error shall be returned and appropriate additional error information is returned in the DELETE response body.

In one or more embodiments of the present invention, HSS+UDM is configured to expose a CN type change event or an event on CN registration state change. Thus, when UE's mobility between 5GC and EPC occurs, the subscriber of this event will be notified, and the functions associated with the event is performed based on the new CN type of the UE correspondingly. Preferably, besides service operation for subscribing, service operations for updating, unsubscribing and notifying for the CN type change event are also supported.

Figure 4:
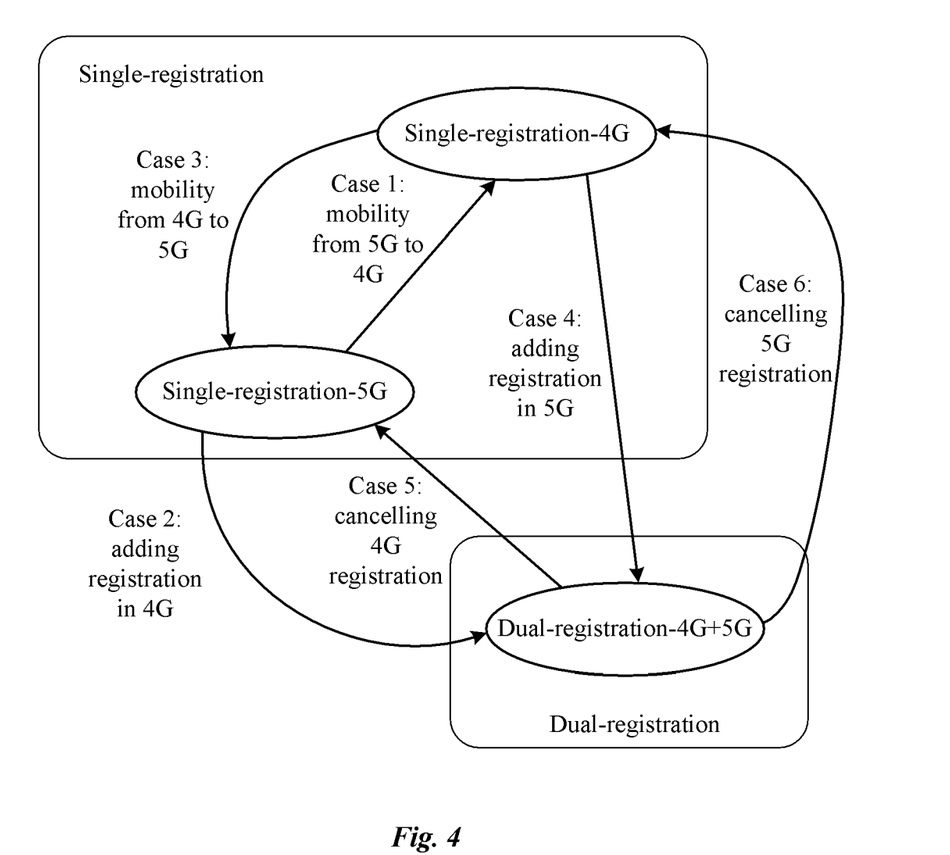
FIG. 4 is a diagram illustrating transitions among CN registration states.

FIG. 4 is a diagram illustrating CN registration state changes. As shown in FIG. 4, a UE can switch among a plurality of CN registration states.

For case 1, when the UE moves from a 5G coverage area to a 4G coverage area, the UE switches from single registration in 5G to single registration in 4G or EPC.

For case 2, when the UE supports dual registration and moves from a 5G coverage area to an area where both 4G and 5G are covered, the UE switches from single registration in 5G to dual registration in 4G+5G.

For case 3, when the UE moves from a 4G coverage area to 5G coverage area or to an area covered by both 4G and 5G, the UE switches from single registration in 4G to single registration in 5G.

For case 4, when the UE moves from an 4G coverage area to an area covered by both 4G and 5G and supports dual registration, the UE switches from single registration in 4G to dual registration in 4G+5G.

For case 5, when the UE moves from an area where both 4G and 5G are covered to an area where only 5G covered or the UE cancels the registration in 4G even if both 4G and 5G are covered, the UE switches from dual registration in 4G+5G to single registration in 5G.

For case 6, when the UE moves from an area where both 4G and 5G are covered to an area where only 4G are covered or the UE cancel the registration in 5G even if both 4G and 5G are covered, the UE switches from dual registration in 4G+5G to single registration in 4G.

Figure 5:
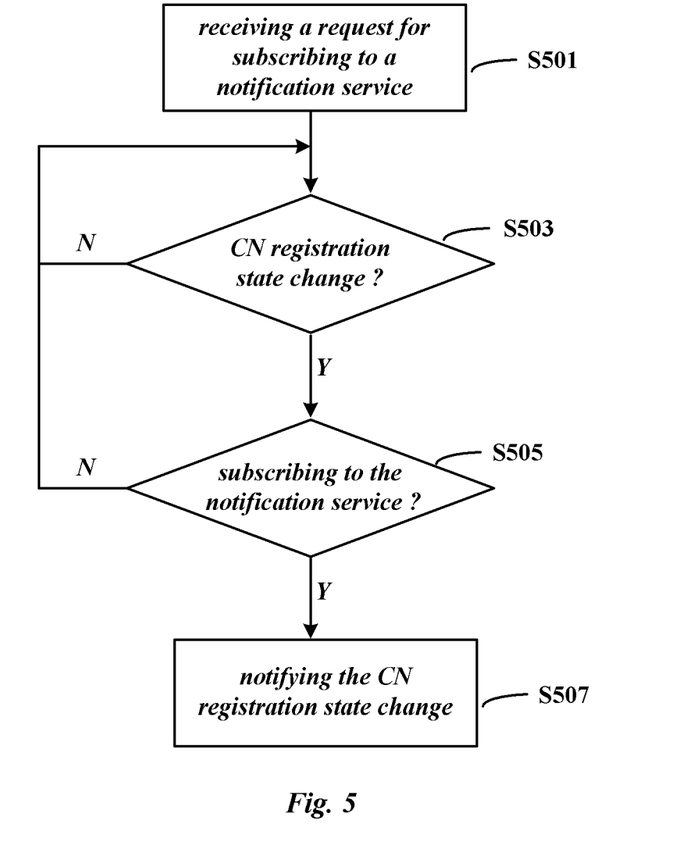
FIG. 5 is a flow diagram illustrating a process for supporting interworking between core networks (CNs) performed at a user profile server according to one or more exemplary embodiment of the present invention.

FIG. 5 is a flow diagram illustrating a process for supporting interworking between core networks (CNs) performed at a user profile server according to one or more exemplary embodiment of the present invention. The user profile server can be implemented by a combination of a Home Subscriber Server (HSS) and a Unified Database Management (UDM). Alternatively, the user profile server can be implemented by a combination of a Home Subscriber Server (HSS), a Unified Database Management (UDM), and a Unified/User Data Repository (UDR).

With reference to FIG. 5, at step S501, the user profile server receives from a NF service consumer, e.g., a NEF+SCEF node, a request for subscribing to a notification service for CN registration state changes or CN type change events for a specified user equipment (UE). Alternatively, the subscribing may be made for a group of UEs.

Then, the process proceeds to step S503, the user profile server starts to monitor or detect whether a CN registration state change or CN type change event for the specified UE or the specified group of UEs. For example, the user profile server may perform the detecting by judging whether a user location update is received. If it determines that the a CN registration state change occurs, the process proceeds to step S505; otherwise, the user profile server continues to detect the occurrence of the CN registration state change.

At step S505, in response to the CN registration state change for the UE, the user profile server determines whether the UE subscribes to a notification service for the CN registration state change. If the UE subscribes to the service, the process proceeds to step S507; otherwise, the process returns to step S503.

At step S507, the user profile server notifies the CN registration state change of the NF node, which, in turn, performs a function associated with the CN registration state change.

Tables 1 and 2 illustrates UDM supported or exposed event types under the current 3GPP specifications and HSS+UDM supported or exposed event types according to one or more exemplary embodiment of the present invention, respectively.

TABLE 1

UDM supported or exposed event types

| Enumeration value | Description |
| --- | --- |
| "LOSS_OF_CONNECTIVITY" | Loss of connectivity |
| "UE_REACHABILITY_FOR_DATA" | UE reachability for data |
| "UE_REACHABILITY_FOR_SMS" | UE reachability for SMS |
| "LOCATION_REPORTING" | Location Reporting |
| "CHANGE_OF_SUPI_PEI_ASSOCIATION" | Change of SUPI-PEI association |
| "ROAMING_STATUS" | Roaming Status |
| COMMUNICATION FAILURE | Communication Failure |
| "AVAILABILITY_AFTER_DNN_FAILURE" | Availability after DNN failure |
| CN TYPE CHANGE | CN type change |

TABLE 2

HSS + UDM supported or exposed event types

| Enumeration value | Description |
| --- | --- |
| "LOSS_OF_CONNECTIVITY" | Loss of connectivity |
| "UE_REACHABILITY_FOR_DATA" | UE reachability for data |
| "UE_REACHABILITY_FOR_SMS" | UE reachability for SMS |
| "LOCATION_REPORTING" | Location Reporting |
| "CHANGE_OF_SUPI_PEI_ASSOCIATION" | Change of SUPI-PEI association |
| "ROAMING_STATUS" | Roaming Status |
| COMMUNICATION FAILURE | Communication Failure |
| "AVAILABILITY_AFTER_DNN_FAILURE" | Availability after DNN failure |
| CN TYPE CHANGE | CN type change |

As compared with Table 1, a new even type "CN TYPE CHANGE" is newly added in Table 2.

For illustrative purpose, the notifying may be performed by sending the NF node a report as specified in Tables 3 and 4.

TABLE 3

Definition of type CNTypeChangeReport

| Attribute name | Data type | P | Cardinality | Description |
| --- | --- | --- | --- | --- |
| oldCNType | CNType | O | 1 | the old ON type |
| newCNType | CNType | M | 1 | the new ON type |

TABLE 4

Enumeration CNType

| Enumeration value | Description |
| --- | --- |
| "SINGLE_4G" | Single registration in 4G |
| "SINGLE_5G" | Single registration in 4G |
| "DUAL_4G5G" | Dual registration in 4G and 5G |

As can be seen from Table 3, the report may only indicates which CN the UE currently registers. In another embodiment, the report may indicate which CNs the UE currently and previously registers.

For example, when the UE switches from single-registration-5G to single-registration-4G, the report may be generated as follows:
Event Type: CNTypeChangeReport
oldCNType: SINGLE_5G
newCNType: SINGLE_4G When the UE switches from single-registration-5G to dual-registration-4G+5G, the report may be generated as follows:
Event Type: CNTypeChangeReport
oldCNType: SINGLE_5G
newCNType: DUAL_4G5G When the UE switches from single-registration-4G to single-registration-5G, the report may be generated as follows:
Event Type: CNTypeChangeReport
oldCNType: SINGLE_4G
newCNType: SINGLE_5G When the UE switches from single-registration-4G to dual-registration-4G+5G, the report may be generated as follows:
Event Type: CNTypeChangeReport
oldCNType: SINGLE_4G
newCNType: DUAL_4G5G When the UE switches from dual-registration-4G+5G to dual-registration-4G, the report may be generated as follows:
Event Type: CNTypeChangeReport
oldCNType: DUAL_4G5G
newCNType: SINGLE_4G When the UE switches from dual-registration-4G+5G to dual-registration-5G, the report may be generated as follows:
Event Type: CNTypeChangeReport
oldCNType: DUAL_4G5G
newCNType: SINGLE_5G FIG. 6 is a block diagram illustrating an apparatus for supporting interworking between core networks (CNs) according to one or more exemplary embodiment of the present invention.

Figure 6:
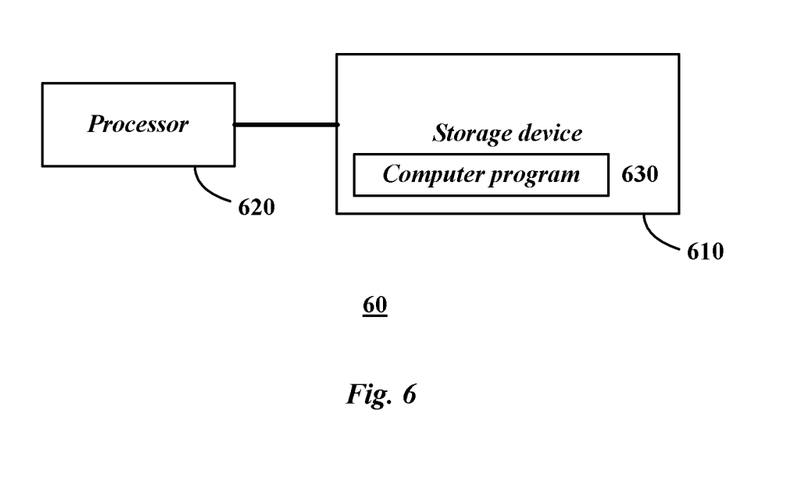
FIG. 6 is a block diagram illustrating an apparatus for supporting interworking between core networks (CNs) according to one or more exemplary embodiment of the present invention.

With reference to FIG. 6, the apparatus 60 comprises a storage device 610 and a processor 620 coupled to the storage device 610. The storage device 610 is configured to store a computer program 630 comprising computer instructions. The processor 620 is configured to execute the computer instructions to perform some or all of the method steps as shown in FIG. 5.

According to one or more embodiments of the present invention, it provides a computer program product for supporting interworking between core networks (CNs), the computer program product being embodied in a computer readable storage medium and comprising computer instructions to perform some or all of the method steps as shown in FIG. 5.

Figure 7:
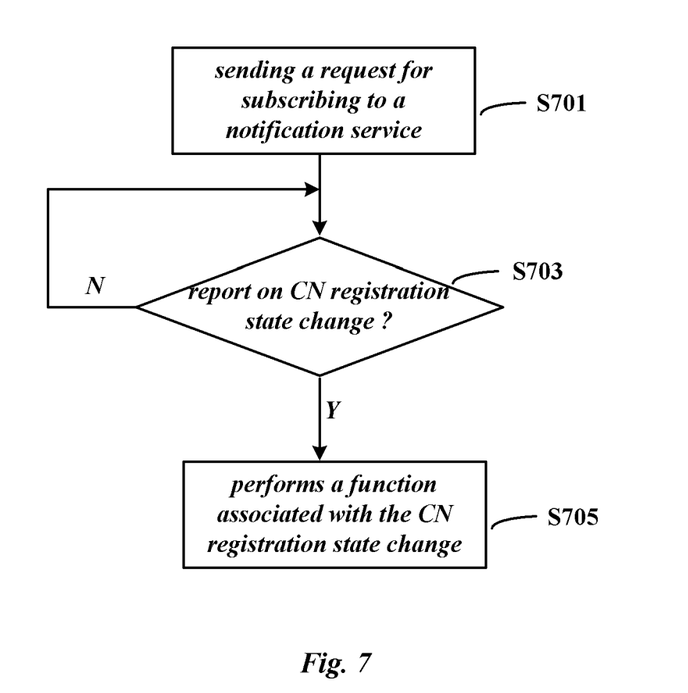
FIG. 7 is a flow diagram illustrating a process for supporting interworking between core networks (CNs) performed at a network function (NF) node, e.g., SCEF+NEF, according to one or more exemplary embodiment of the present invention.

FIG. 7 is a flow diagram illustrating a process for supporting interworking between core networks (CNs) performed at a network function (NF) node, e.g., SCEF+NEF, according to one or more exemplary embodiment of the present invention.

With reference to FIG. 7, at step S701, the NF node sends to a user profile server, e.g., HSS+UDM, a request for subscribing to a notification service for CN registration state changes or CN type change events for a specified user equipment (UE). Alternatively, the subscribing may be made for a group of UEs.

Then, the process proceeds to step S703, the NF node starts to monitor or detect whether a report on CN registration state change or CN type change event for the specified UE or the specified group of UEs is received from the user profile server. If the report is received, the process proceeds to step S705; otherwise, the NF node continues to detect the receipt of the report.

At step S705, in response to the CN registration state change for the UE, the NF node performs a function associated with the CN registration state change.

Figure 8:
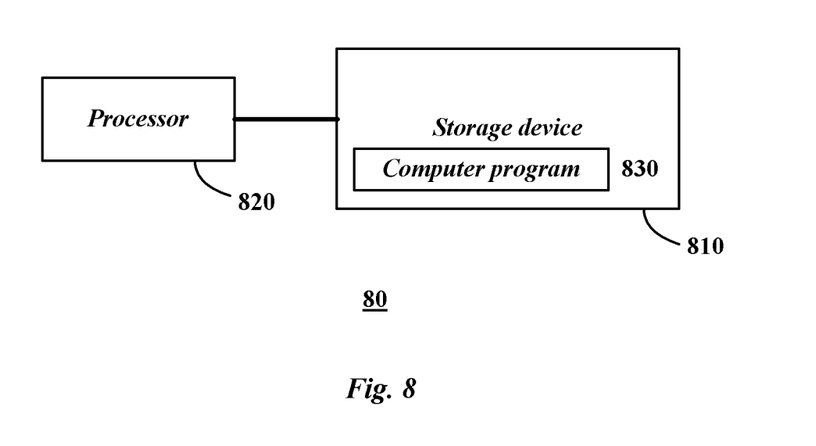
FIG. 8 is a block diagram illustrating a network function (NF) node for supporting interworking between core networks (CNs) according to one or more exemplary embodiment of the present invention.

FIG. 8 is a block diagram illustrating a network function (NF) node for supporting interworking between core networks (CNs) according to one or more exemplary embodiment of the present invention.

With reference to FIG. 8, the apparatus 80 comprises a storage device 810 and a processor 820 coupled to the storage device 810. The storage device 810 is configured to store a computer program 830 comprising computer instructions. The processor 820 is configured to execute the computer instructions to perform some or all of the method steps as shown in FIG. 7.

According to one or more embodiments of the present invention, it provides a computer program product for supporting interworking between core networks (CNs), the computer program product being embodied in a computer readable storage medium and comprising computer instructions to perform some or all of the method steps as shown in FIG. 7.

Figure 9:
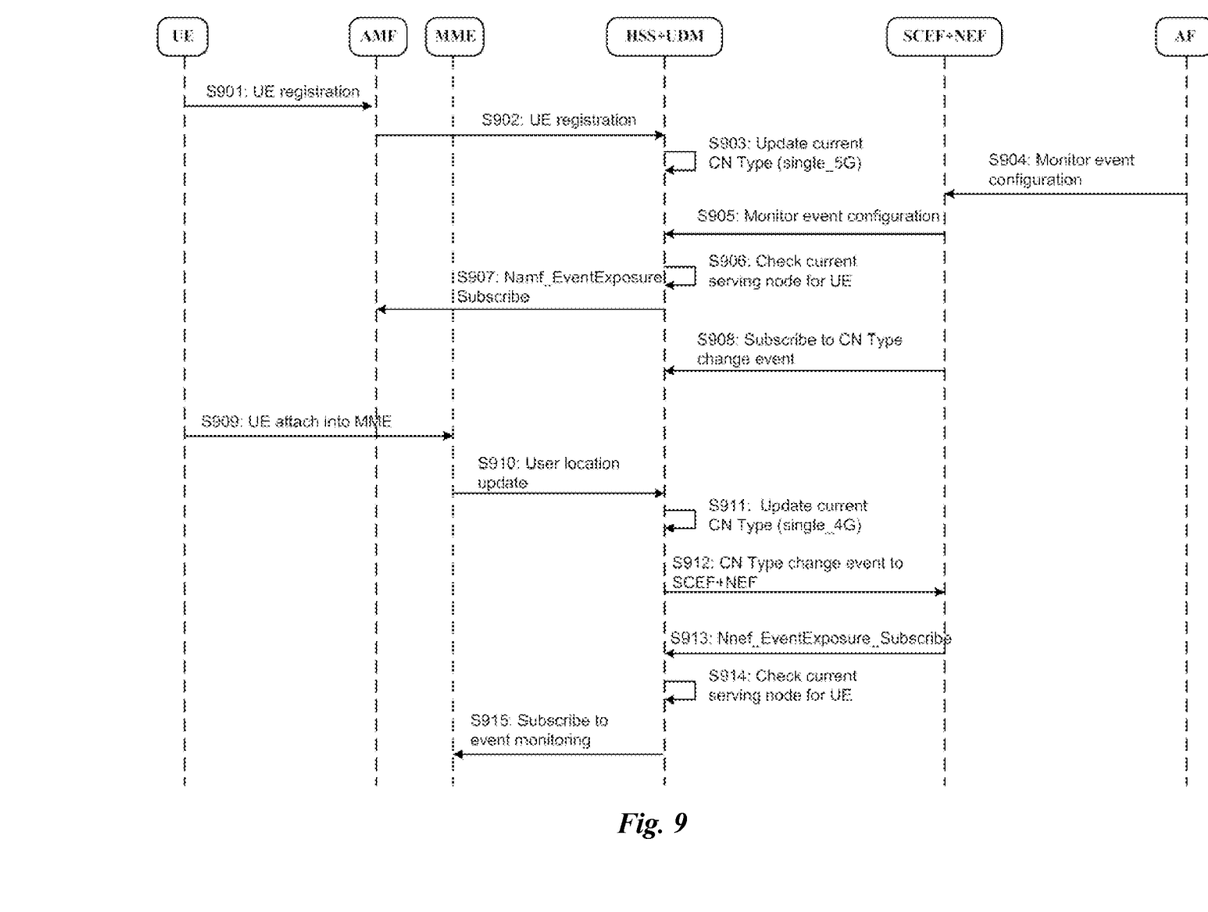
FIG. 9 is a flow diagram illustrating a process for monitoring events at Application Function (AF) with notification on CN registration state change according to one or more exemplary embodiment of the present invention.

FIG. 9 is a flow diagram illustrating a process for monitoring events at Application Function (AF) with notification on CN registration state change according to one or more exemplary embodiment of the present invention. For illustrative purpose, it supposes UE only supports single registration, SCEF+NEF hides the underlying 3GPP network topology from the AF (e.g. SCS/AS) and hides whether the UE is served by 5GC or EPC. Therefore, from the view point of AF, it is a common event monitoring procedure.

With reference to FIG. 9, at step S901, UE initiates registration into 5G system, and a registration request goes through AMF.

Then, at step S902, AMF registers into UDM.

At step S903, UDM updates the UE's CN registration state (SINGLE_5G), either locally or if stateless into an external storage, e.g., UDR. At step S904, AF initiates a monitoring event configuration for an event, e.g., location update and sends common event monitoring configuration to SCEF+NEF.

At step S905, SCEF+NEF sends a event monitoring request to HSS+UDM for the event.

At step S906: HSS+UDM checks the current serving node for UE. Since now it is only registered in 5G, the serving node is AMF.

At step S907: HSS+UDM subscribes to the event monitoring at AMF through 5G interface by sending Namf_EventExposure Subscribe request. Alternatively, SCEF+NEF may subscribe to the event monitoring at AMF directly by get serving AMF from HSS+UDM.

At step S908: SCEF+NEF subscribes to a notification service on CN type change event at UDM or HSS+UDM.

Assuming that UE enters an area with only 4G coverage, UE will initiate a attach request and register into 4G through MME at step S909.

At step S910, MME sends a User Location update request into HSS or HSS+UDM.

At step S911, HSS+UDM updates the UE's CN registration state to SINGLE_4G, either locally or if stateless into an external storage.

At step S912, HSS+UDM notifies SCEF+NEF of the CN registration state change or CN type change event, e.g., by sending a report generated as follows:
Event Type: CNTypeChangeReport
oldCNType: SINGLE_5G
newCNType: SINGLE_4G At step S913, SCEF+NEF re-requests the previous event monitoring by sending Nnef_EventExposure Subscribe request.

At step S914, HSS+UDM checks the current serving node for the UE, which now becomes MME.

At step S915, HSS+UDM subscribes to the event monitoring at MME through 4G interface. Alternatively, SCEF+NEF may subscribe to the event monitoring at MME directly by get serving MME from HSS+UDM.

It should be noted that the aforesaid embodiments are illustrative of this invention instead of restricting this invention, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names. While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. An apparatus for supporting interworking between core networks (CNs), the apparatus comprising:
a storage device configured to store a computer program comprising non-transitory computer instructions; and
a processor coupled to the storage device and configured to execute the computer instructions to:
in response to a CN registration state change for a user equipment (UE), determine whether the UE subscribes to a notification service for the CN registration state change;
if subscribing to the notification service, notify the CN registration state change of a network function (NF) node performing a function associated with the CN registration state change, the NF node being a Service Capability Exposure function (SCEF)+Network Exposure Function (NEF) node, and the function relating to a location update; and
the CN registration state change comprises switching to or from dual registration in a 5G, EPC+5G, or EPC core network.

2. The apparatus according to claim 1, wherein the apparatus is implemented by a combination of a Home Subscriber Server (HSS) and a Unified Database Management (UDM).

3. The apparatus according to claim 1, wherein the apparatus is implemented by a combination of a Home Subscriber Server (HSS), a Unified Database Management (UDM), and a Unified/User Data Repository (UDR).

4. The apparatus according to claim 1, wherein the notifying is performed by sending the NF node a report indicating which CN the UE currently registers.

5. The apparatus according to claim 1, wherein the notifying is performed by sending the NF node a report indicating which CNs the UE currently and previously registers.

6. The apparatus according to claim 1, wherein the CN comprises an EPC network and a 5G core network, and the CN registration state change is at least one of the following: switching from single registration in 5G to single registration in EPC, switching from single registration in 5G to dual registration in EPC+5G, switching from single registration in EPC to single registration in 5G, switching from single registration in EPC to dual registration in EPC+5G, switching from dual registration in EPC+5G to single registration in 5G, switching from dual registration in EPC+5G to single registration in EPC.

7. The apparatus according to claim 1, wherein the subscribing is performed by receiving a request for subscribing to the notification service from the SCEF+NEF node.

8. A method for supporting interworking between core networks (CNs), the method comprising, at a user profile server:
in response to a CN registration state change for a user equipment (UE), determining whether the UE subscribes to a notification service for the CN registration state change;
if subscribing to the notification service, notifying the CN registration state change of a network function (NF) node performing a function associated with the CN registration state change, the NF node bring a Service Capability Exposure function (SCEF)+Network Exposure Function (NEF) node, and the function relating to a location update; and
the CN registration state change comprises switching to or from dual registration in a 5G, EPC+5G, or EPC core network.

9. The method according to claim 8, wherein the user profile server is implemented by a combination of a Home Subscriber Server (HSS) and a Unified Database Management (UDM).

10. The method according to claim 8, wherein the user profile server is implemented by a combination of a Home Subscriber Server (HSS), a Unified Database Management (UDM), and a Unified/User Data Repository (UDR).

11. A computer storage medium storing a non-transitory computer program for supporting interworking between core networks (CNs), the computer program comprising computer instructions for:
- in response to a CN registration state change for a user equipment (UE), determining whether the UE subscribes to a notification service for the CN registration state change;
- if subscribing to the notification service, notifying the CN registration state change of a network function (NF) node performing a function associated with the CN registration state change the NF node being a Service Capability Exposure function (SCEF)+Network Exposure Function (NEF) node, and the function relating to a location update; and
- the CN registration state change comprises switching to or from dual registration in a 5G, EPC+5G, or EPC core network.

12. A network function (NF) node for supporting interworking between core networks (CNs), the NF node comprising:
- a storage device configured to store a computer program comprising computer instructions; and
- a processor coupled to the storage device and configured to execute the computer instructions to:
  - send to a user profile server a request for subscribing to a notification service for a CN registration state change for a user equipment (UE);
  - receive from the user profile server a report on the CN registration state change;
  - perform a function associated with the CN registration state change, the function relating to a location update; and
  - the CN registration state change comprises switching to or from dual registration in a 5G, EPC+5G, or EPC core network.

13. The NF node according to claim 12, wherein the NF node is a Service Capability Exposure function (SCEF)+ Network Exposure Function (NEF) node.

14. The NF node according to claim 12, wherein the processor is configured to further execute the computer instructions to:
- send to the user profile server a request for unsubscribing to the notification service.

15. The NF node according to claim 12, wherein the user profile server is implemented by a combination of a Home Subscriber Server (HSS) and a Unified Database Management (UDM).

16. The NF node according to claim 12, wherein the user profile server is implemented by a combination of a Home Subscriber Server (HSS), a Unified Database Management (UDM), and a Unified/User Data Repository (UDR).

17. The NF node according to claim 12, wherein the report indicates which CN the UE currently registers.

18. The NF node according to claim 12, wherein the report indicates which CNs the UE currently and previously registers.

19. The NF node according to claim 12, wherein the CN comprises an EPC network and a 5G core network, and the CN registration state change is at least one of the following: switching from single registration in 5G to single registration in EPC, switching from single registration in 5G to dual registration in EPC+5G, switching from single registration in EPC to single registration in 5G, switching from single registration in EPC to dual registration in EPC+5G, switching from dual registration in EPC+5G to single registration in 5G, switching from dual registration in EPC+5G to single registration in EPC.

20. A method for supporting interworking between core networks (CNs), the method comprising, at a network function (NF) node:
- sending to a user profile server a request for subscribing to a notification service for a CN registration state change for a user equipment (UE);
- receiving from the user profile server a report on the CN registration state change;
- performing a function associated with the CN registration state change, the function relating to a location update; and
- the CN registration state change comprises switching to or from dual registration in a 5G, EPC+5G, or EPC core network.

21. The method according to claim 20, further comprising:
- sending to the user profile server a request for unsubscribing to the notification service.

22. A computer storage medium storing a non-transitory computer program for supporting interworking between core networks (CNs), the computer program comprising computer instructions for:
- sending to a user profile server a request for subscribing to a notification service for a CN registration state change for a user equipment (UE);
- receiving from the user profile server a report on the CN registration state change;
- performing a function associated with the CN registration state change, the function relating to a location update; and
- the CN registration state change comprises switching to or from dual registration in a 5G, EPC+5G, or EPC core network.

* * * * *